(12) United States Patent
Wang et al.

(10) Patent No.: US 12,717,478 B2
(45) Date of Patent: Aug. 25, 2026

(54) WRITE CONTROL METHOD BASED ON WRITE BEHAVIOR PREDICTION, MEMORY STORAGE DEVICE, AND MEMORY CONTROL CIRCUIT UNIT

(71) Applicant: Hefei Core Storage Electronic Limited, Anhui (CN)

(72) Inventors: Chih-Ling Wang, Anhui (CN); Fan Yi, Hunan (CN); Kuai Cao, Anhui (CN); Yang Chen, Anhui (CN); Qin Qin Tao, Anhui (CN); Dong Sheng Rao, Anhui (CN)

(73) Assignee: Hefei Core Storage Electronic Limited, Anhui (CN)

( * ) Notice: Subject to any disclaimer, the term of this patent is extended or adjusted under 35 U.S.C. 154(b) by 0 days.

(21) Appl. No.: 17/745,891

(22) Filed: May 17, 2022

(65) Prior Publication Data

US 2023/0359357 A1 Nov. 9, 2023

(30) Foreign Application Priority Data

May 5, 2022 (CN) ......................... 202210482949.4

(51) Int. Cl.
*G06F 3/06* (2006.01)
*G06F 11/07* (2006.01)

(52) U.S. Cl.
CPC ............ *G06F 3/061* (2013.01); *G06F 3/0659* (2013.01); *G06F 3/0673* (2013.01); *G06F 11/073* (2013.01)

(58) Field of Classification Search
CPC ...... G06F 3/061; G06F 3/0613; G06F 3/0659; G06F 3/0673; G06F 11/3452; G06F 11/073
See application file for complete search history.

(56) References Cited

U.S. PATENT DOCUMENTS 9,703,664 B1 * 7/2017 Alshawabkeh ......... G06F 3/067
2015/0100721 A1 4/2015 Koseki
(Continued)

FOREIGN PATENT DOCUMENTS

CN 104951248 9/2015
CN 107408017 7/2020
(Continued)

OTHER PUBLICATIONS

"Office Action of Taiwan Counterpart Application", issued on Nov. 29, 2022, p. 1-p. 5.
(Continued)

*Primary Examiner* — Ernest Unelus
(74) *Attorney, Agent, or Firm* — JCIPRNET

(57) ABSTRACT

A write control method based on write behavior prediction, a memory storage device, and a memory control circuit unit are provided. The method includes: monitoring a first data write behavior of a host system during a first time range; according to the first data write behavior, predicting a second data write behavior of the host system during a second time range; obtaining a first measurement parameter and a first target parameter corresponding to the first data write behavior; according to the first measurement parameter, the first target parameter, and the second data write behavior, determining a write control parameter; and sending a write command sequence according to the write control parameter to instruct a rewritable non-volatile memory module to perform a data write based on multiple write modes during the second time range.

12 Claims, 6 Drawing Sheets

(56) References Cited

U.S. PATENT DOCUMENTS

| | | | | |
|---|---|---|---|---|
| 2018/0067697 | A1* | 3/2018 | Lee | G06F 3/0656 |
| 2019/0073139 | A1* | 3/2019 | Kim | G06F 3/0688 |

FOREIGN PATENT DOCUMENTS

| | | |
|---|---|---|
| CN | 111736773 | 10/2020 |
| CN | 112328454 | 2/2021 |
| CN | 114168495 | 3/2022 |
| JP | 2003187522 | 7/2003 |
| TW | 724071 | 4/2021 |

OTHER PUBLICATIONS

"Office Action of China Counterpart Application", issued on Feb. 28, 2025, p. 1-p. 6.

* cited by examiner

WRITE CONTROL METHOD BASED ON WRITE BEHAVIOR PREDICTION, MEMORY STORAGE DEVICE, AND MEMORY CONTROL CIRCUIT UNIT

CROSS-REFERENCE TO RELATED APPLICATION

This application claims the priority benefit of China application serial no. 202210482949.4, filed on May 5, 2022. The entirety of the above-mentioned patent application is hereby incorporated by reference herein and made a part of this specification.

BACKGROUND

Technical Field

The disclosure relates to a memory control technology, and more particularly to a write control method based on write behavior prediction, a memory storage device, and a memory control circuit unit.

Description of Related Art

Some types of memory storage devices support various write modes, such as a single level cell (SLC) mode together with a triple level cell (TLC) mode. In general, the memory storage device may store data to an SLC area based on the SLC mode to reduce the storage capacity of a single memory cell and maximize the data storage speed. After the SLC area is exhausted, the memory storage device may be changed to store data at a slower speed based on the TLC mode, but the storage capacity of a single memory cell can be increased. Thereby, the memory storage device may adopt different write modes to store data in different situations to balance between the data storage speed and the memory capacity. However, in practice, the TLC mode is often synchronously performed with a garbage collection (GC) program, thereby causing a further decrease in the data storage speed of the memory storage device in the TLC mode. In addition, frequent switching between the write modes also easily makes it difficult to maintain a stable data storage speed of the memory storage device.

SUMMARY

The disclosure provides a write control method based on write behavior prediction, a memory storage device, and a memory control circuit unit, which can improve the stability of the data write speed of the memory storage device.

An exemplary embodiment of the disclosure provides a write control method based on write behavior prediction, which is used for a rewritable non-volatile memory module. The write control method includes the following steps. A first data write behavior of a host system during a first time range is monitored. According to the first data write behavior, a second data write behavior of the host system during a second time range is predicted. The second time range is different from the first time range. A first measurement parameter and a first target parameter corresponding to the first data write behavior are obtained. According to the first measurement parameter, the first target parameter, and the second data write behavior, a write control parameter is determined. A write command sequence is sent according to the write control parameter to instruct the rewritable non-volatile memory module to perform a data write based on multiple write modes during the second time range. A write data amount corresponding to each of the write modes is controlled by the write control parameter.

An exemplary embodiment of the disclosure further provides a memory storage device, which includes a connection interface unit, a rewritable non-volatile memory module, and a memory control circuit unit. The connection interface unit is used to couple to a host system. The memory control circuit unit is coupled to the connection interface unit and the rewritable non-volatile memory module. The memory control circuit unit is used to perform the following. A first data write behavior of the host system during a first time range is monitored. According to the first data write behavior, a second data write behavior of the host system during a second time range is predicted. The second time range is different from the first time range. A first measurement parameter and a first target parameter corresponding to the first data write behavior are obtained. According to the first measurement parameter, the first target parameter, and the second data write behavior, a write control parameter is determined. A write command sequence is sent according to the write control parameter to instruct the rewritable non-volatile memory module to perform a data write based on multiple write modes during the second time range. A write data amount corresponding to each of the write modes is controlled by the write control parameter.

An exemplary embodiment of the disclosure further provides a memory control circuit unit, which is used to control a rewritable non-volatile memory module. The memory control circuit unit includes a host interface, a memory interface, and a memory management circuit. The host interface is used to couple to a host system. The memory interface is used to couple to the rewritable non-volatile memory module. The memory management circuit is coupled to the host interface and the memory interface. The memory management circuit is used perform the following. A first data write behavior of the host system during a first time range is monitored. According to the first data write behavior, a second data write behavior of the host system during a second time range is predicted. The second time range is different from the first time range. A first measurement parameter and a first target parameter corresponding to the first data write behavior are obtained. According to the first measurement parameter, the first target parameter, and the second data write behavior, a write control parameter is determined. A write command sequence is sent according to the write control parameter to instruct the rewritable non-volatile memory module to perform a data write based on multiple write modes during the second time range. A write data amount corresponding to each of the write modes is controlled by the write control parameter.

Based on the above, after monitoring the first data write behavior of the host system during the first time range, the second data write behavior of the host system during the second time range may be predicted according to the first data write behavior. In addition, after obtaining the first measurement parameter and the first target parameter corresponding to the first data write behavior, according to the first measurement parameter, the first target parameter, and the second data write behavior, the write control parameter may be determined and the write command sequence may be sent according to the write control parameter to instruct the rewritable non-volatile memory module to perform the data write based on the write modes during the second time range. In particular, the write data amount corresponding to each of the write modes is controlled by the write control parameter. Thereby, the stability of the data write speed of the memory storage device can be improved.

DETAILED DESCRIPTION OF DISCLOSED EMBODIMENTS

Generally speaking, a memory storage device (also referred to as a memory storage system) includes a rewritable non-volatile memory module and a controller (also referred to as a control circuit). The memory storage device may be used together with a host system, so that the host system may write data into the memory storage device or read data from the memory storage device.

Figure 1:
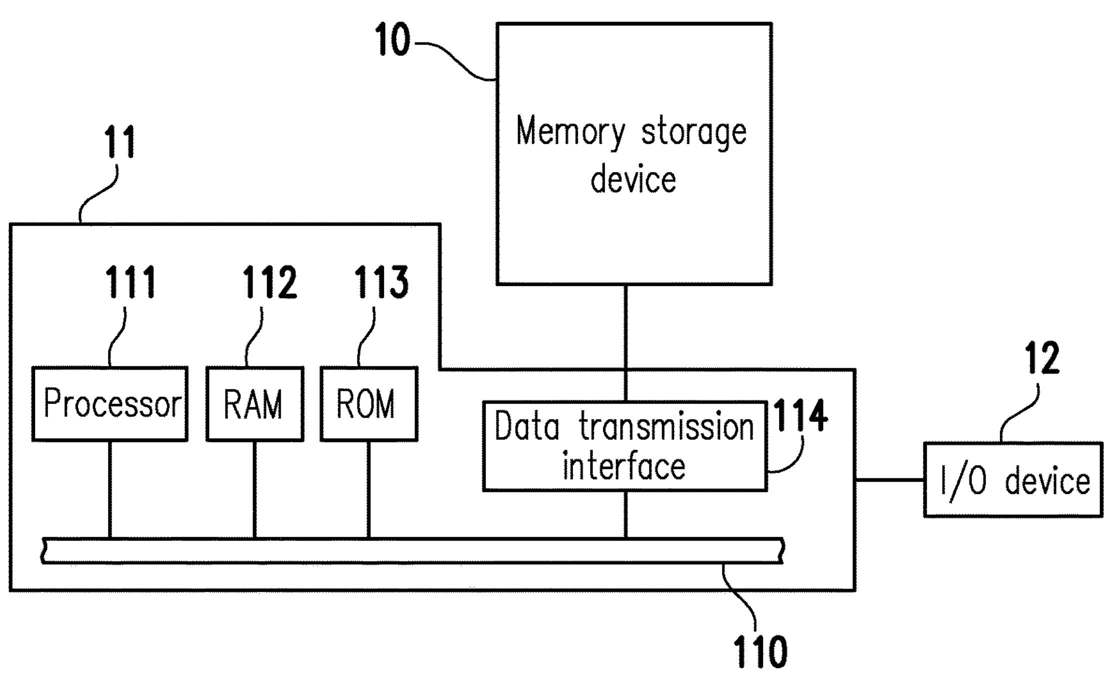
FIG. 1 is a schematic diagram of a host system, a memory storage device, and an input/output (I/O) device according to an exemplary embodiment of the disclosure.
Figure 2:
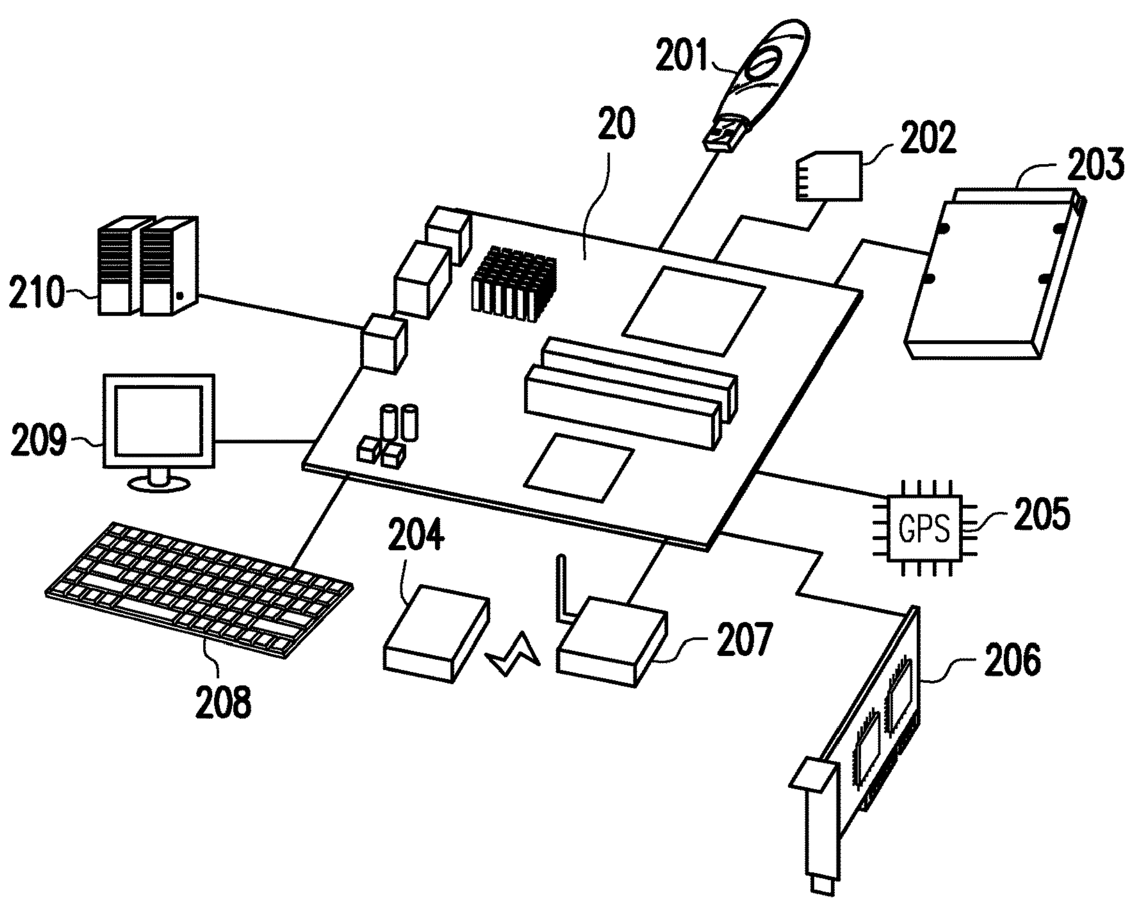
FIG. 2 is a schematic diagram of a host system, a memory storage device, and an I/O device according to an exemplary embodiment of the disclosure.

FIG. 1 is a schematic diagram of a host system, a memory storage device, and an input/output (I/O) device according to an exemplary embodiment of the disclosure. FIG. 2 is a schematic diagram of a host system, a memory storage device, and an I/O device according to an exemplary embodiment of the disclosure.

Please refer to FIG. 1 and FIG. 2. A host system 11 may include a processor 111, a random access memory (RAM) 112, a read only memory (ROM) 113, and a data transmission interface 114. The processor 111, the random access memory 112, the read only memory 113, and the data transmission interface 114 may be coupled to a system bus 110.

In an exemplary embodiment, the host system 11 is coupled to the memory storage device 10 through the data transmission interface 114. For example, the host system 11 may store data to the memory storage device 10 or read data from the memory storage device 10 via the data transmission interface 114. In addition, the host system 11 may be coupled to the I/O device 12 through the system bus 110. For example, the host system 11 may send an output signal to the I/O device 12 or receive an input signal from the I/O device 12 via the system bus 110.

In an exemplary embodiment, the processor 111, the random access memory 112, the read only memory 113, and the data transmission interface 114 may be disposed on a motherboard 20 of the host system 11. The number of the data transmission interface 114 may be one or more. Through the data transmission interface 114, the motherboard 20 may be coupled to the memory storage device 10 via a wired or wireless manner.

In an exemplary embodiment, the memory storage device 10 may, for example, be a flash drive 201, a memory card 202, a solid state drive (SSD) 203, or a wireless memory storage device 204. The wireless memory storage device 204 may, for example, be a near field communication (NFC) memory storage device, a wireless fax (WiFi) memory storage device, a Bluetooth memory storage device, a low-power Bluetooth memory storage device (for example, iBeacon), or other memory storage devices based on various wireless communication technologies. In addition, the motherboard 20 may also be coupled to a global positioning system (GPS) module 205, a network interface card 206, a wireless transmission device 207, a keyboard 208, a screen 209, a speaker 210, or various other I/O devices through the system bus 110. For example, in an exemplary embodiment, the motherboard 20 may access the wireless memory storage device 204 through the wireless transmission device 207.

In an exemplary embodiment, the host system 11 is a computer system. In an exemplary embodiment, the host system 11 may be any system that may substantially cooperate with a memory storage device to store data. In an exemplary embodiment, the memory storage device 10 and the host system 11 may respectively include a memory storage device 30 and a host system 31 of FIG. 3.

Figure 3:
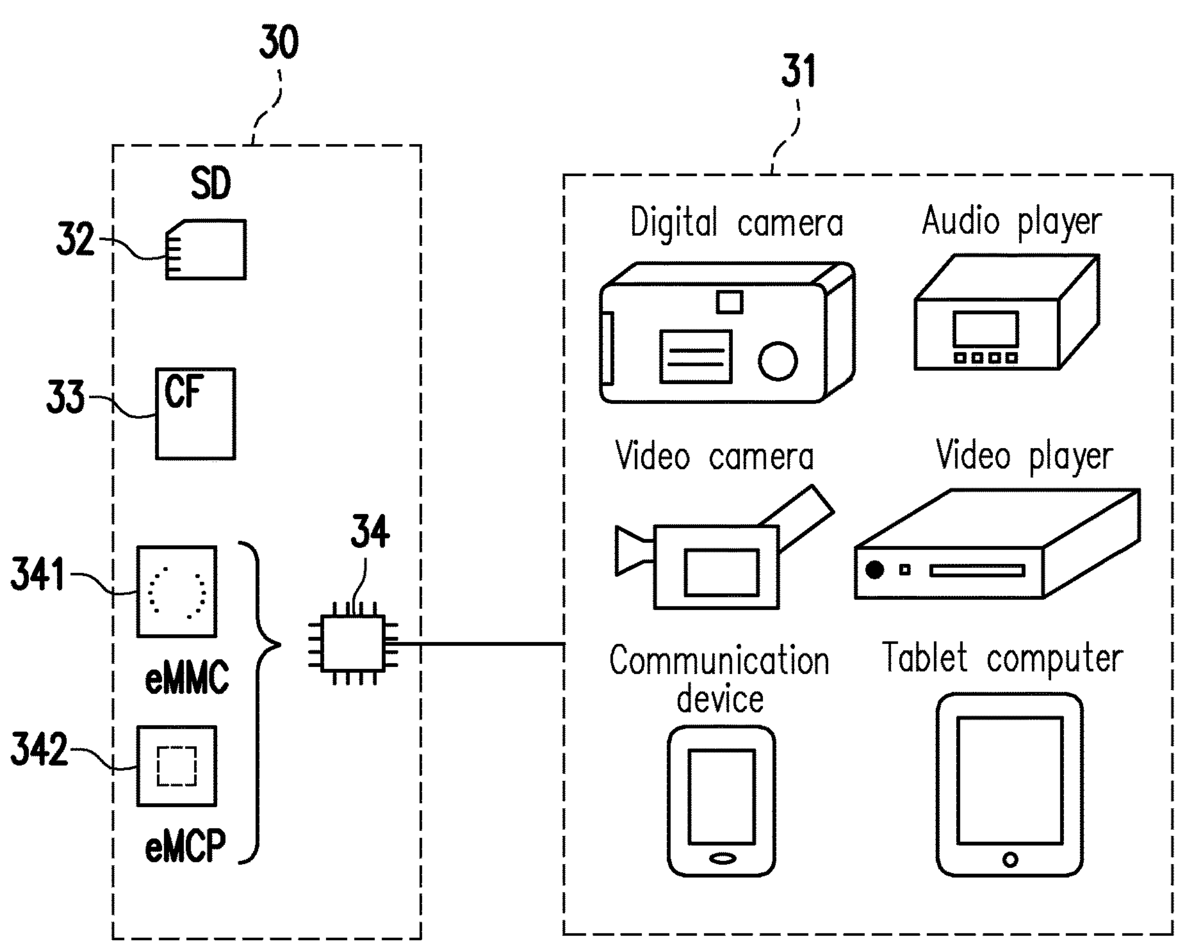
FIG. 3 is a schematic diagram of a host system and a memory storage device according to an exemplary embodiment of the disclosure.

FIG. 3 is a schematic diagram of a host system and a memory storage device according to an exemplary embodiment of the disclosure. Please refer to FIG. 3. The memory storage device 30 may be used together with the host system 31 to store data. For example, the host system 31 may be a system such as a digital camera, a video camera, a communication device, an audio player, a video player, or a tablet computer. For example, the memory storage device 30 may be various non-volatile memory storage devices such as a secure digital (SD) card 32, a compact flash (CF) card 33, or an embedded storage device 34 used by the host system 31. The embedded storage device 34 includes an embedded multi media card (eMMC) 341, an embedded multi chip package (eMCP) storage device 342, and/or various other embedded storage devices in which a memory module is directly coupled onto a substrate of a host system.

Figure 4:
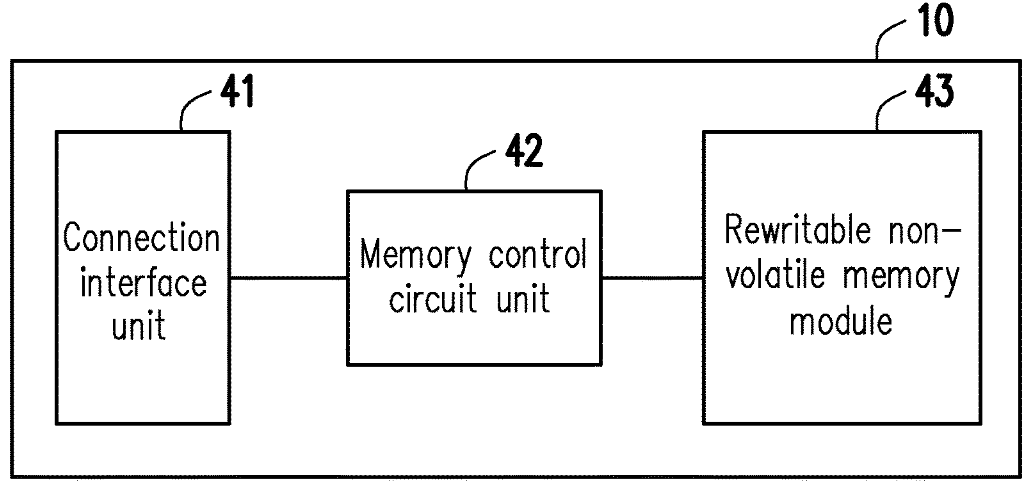
FIG. 4 is a schematic diagram of a memory storage device according to an exemplary embodiment of the disclosure.

FIG. 4 is a schematic diagram of a memory storage device according to an exemplary embodiment of the disclosure. Please refer to FIG. 4. The memory storage device 10 includes a connection interface unit 41, a memory control circuit unit 42, and a rewritable non-volatile memory module 43.

The connection interface unit 41 is used to couple the memory storage device 10 to the host system 11. The memory storage device 10 may communicate with the host system 11 via the connection interface unit 41. In an exemplary embodiment, the connection interface unit 41 is compatible with the peripheral component interconnect express (PCI express) standard. In an exemplary embodiment, the connection interface unit 41 may also conform to the serial advanced technology attachment (SATA) standard, the parallel advanced technology attachment (PATA) standard, the Institute of Electrical and Electronic Engineers (IEEE) 1394 standard, the universal serial bus (USB) standard, the SD interface standard, the ultra high speed-I (UHS-I) interface standard, the ultra high speed-II (UHS-II) interface standard, the memory stick (MS) interface standard, the MCP interface standard, the MMC interface standard, the eMMC interface standard, the universal flash storage (UFS) interface standard, the eMCP interface standard, the CF interface standard, the integrated device electronics (IDE) standard, or other suitable standards. The connection interface unit 41 may be packaged in one chip with the memory control circuit unit 42, or the connection interface unit 41 may be arranged outside a chip containing the memory control circuit unit 42.

The memory control circuit unit 42 is coupled to the connection interface unit 41 and the rewritable non-volatile memory module 43. The memory control circuit unit 42 is used to perform multiple logic gates or control commands implemented in the form of hardware or the form of firmware and perform operations such as data writing, reading, and erasing in the rewritable non-volatile memory module 43 according to a command of the host system 11.

The rewritable non-volatile memory module 43 is used to store data written by the host system 11. The rewritable non-volatile memory module 43 may include an SLC NAND flash memory module (that is, a flash memory module that may store 1 bit in one memory cell), a multi level cell (MLC) NAND flash memory module (that is, a flash memory module that may store 2 bits in one memory cell), a TLC NAND flash memory module (that is, a flash memory module that may store 3 bits in one memory cell), a quad level cell (QLC) NAND flash memory module (that is, a flash memory module that may store 4 bits in one memory cell), other flash memory modules, or other memory modules with the same characteristics.

Each memory cell in the rewritable non-volatile memory module 43 stores one or more bits with changes in voltage (hereinafter also referred to as a threshold voltage). Specifically, there is a charge trapping layer between a control gate and a channel of each memory cell. Through applying a write voltage to the control gate, the number of electrons in the charge trapping layer may be changed, thereby changing the threshold voltage of the memory cell. The operation of changing the threshold voltage of the memory cell is also referred to as "writing data into the memory cell" or "programming the memory cell". As the threshold voltage changes, each memory cell in the rewritable non-volatile memory module 43 has multiple storage states. Through applying a read voltage, it is possible to judge which storage state a memory cell belongs to, thereby obtaining one or more bits stored in the memory cell.

In an exemplary embodiment, memory cells of the rewritable non-volatile memory module 43 may constitute multiple physical programming units, and the physical programming units may constitute multiple physical erasing units. Specifically, the memory cells on the same word line may form one or more physical programming units. If each memory cell may store more than 2 bits, the physical programming units on the same word line may be classified into at least a lower physical programming unit and an upper physical programming unit. For example, a least significant bit (LSB) of a memory cell belongs to the lower physical programming unit, and a most significant bit (MSB) of a memory cell belongs to the upper physical programming unit. Generally speaking, in the MLC NAND flash memory, the write speed of the lower physical programming unit is greater than the write speed of the upper physical programming unit, and/or the reliability of the lower physical programming unit is higher than the reliability of the upper physical programming unit.

In an exemplary embodiment, the physical programming unit is the smallest unit of programming. That is, the physical programming unit is the smallest unit of writing data. For example, the physical programming unit may be a physical page or a physical sector. If the physical programming unit is a physical page, the physical programming units may include a data bit area and a redundancy bit area. The data bit area contains multiple physical sectors for storing user data, and the redundancy bit area is used to store system data (for example, management data such as an error correcting code). In an exemplary embodiment, the data bit area contains 32 physical sectors, and the size of one physical sector is 512 bytes (B). However, in other exemplary embodiments, the data bit area may also contain 8, 16, more, or less physical sectors, and the size of each physical sector may also be greater or smaller. On the other hand, the physical erasing unit is the smallest unit of erasure. That is, each physical erasing unit contains the smallest number of memory cells to be erased together. For example, the physical erasing unit is a physical block.

Figure 5:
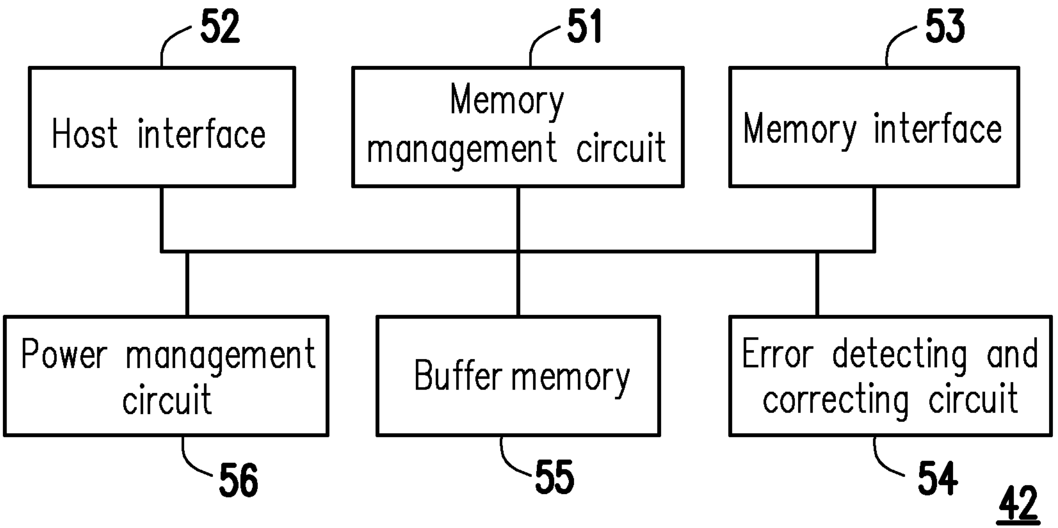
FIG. 5 is a schematic diagram of a memory control circuit unit according to an exemplary embodiment of the disclosure.

FIG. 5 is a schematic diagram of a memory control circuit unit according to an exemplary embodiment of the disclosure. Please refer to FIG. 5. The memory control circuit unit 42 includes a memory management circuit 51, a host interface 52, and a memory interface 53.

The memory management circuit 51 is used to control the overall operation of the memory control circuit unit 42. Specifically, the memory management circuit 51 has multiple control commands, and when the memory storage device 10 is operating, the control commands are performed to perform operations such as data writing, reading, and erasing. The following description of the operation of the memory management circuit 51 is equivalent to the description of the operation of the memory control circuit unit 42.

In an exemplary embodiment, the control commands of the memory management circuit 51 are implemented in the form of firmware. For example, the memory management circuit 51 has a microprocessor unit (not shown) and a read only memory (not shown), and the control commands are burnt into the read only memory. When the memory storage device 10 is operating, the control commands are performed by the microprocessor unit to perform operations such as data writing, reading, and erasing.

In an exemplary embodiment, the control commands of the memory management circuit 51 may also be stored to a specific area (for example, a system area dedicated to storing system data in a memory module) of the rewritable non-volatile memory module 43 in the form of program codes. In addition, the memory management circuit 51 has a microprocessor unit (not shown), a read only memory (not shown), and a random access memory (not shown). In particular, the read only memory has a boot code, and when the memory control circuit unit 42 is enabled, the microprocessor unit first performs the boot code to load the control commands stored in the rewritable non-volatile memory module 43 to the random access memory of the memory management circuit 51. After that, the microprocessor unit runs the control commands to perform operations such as data writing, reading, and erasing.

In an exemplary embodiment, the control commands of the memory management circuit 51 may also be implemented in the form of hardware. For example, the memory management circuit 51 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is used to manage a memory cell or a memory cell group of the rewritable non-volatile memory module 43. The memory write circuit is used to issue a write command sequence to the rewritable non-volatile memory module 43 to write data into the rewritable non-volatile memory module 43. The memory read circuit is used to issue a read command sequence to the rewritable non-volatile memory module 43 to read data from the rewritable non-volatile memory module 43. The memory erase circuit is used to issue an erase command sequence to the rewritable non-volatile memory module 43 to erase data from the rewritable non-volatile memory module 43. The data processing circuit is used to process data to be written into the rewritable non-volatile memory module 43 and data read from the rewritable non-volatile memory module 43. Each of the write command sequence, the read command sequence, and the erase command sequence may include one or more program codes or command codes and be used to instruct the rewritable non-volatile memory module 43 to perform corresponding operations such as writing, reading, and erasing. In an exemplary embodiment, the memory management circuit 51 may also issue other types of command sequences to the rewritable non-volatile memory module 43 to instruct to perform corresponding operations.

The host interface 52 is coupled to the memory management circuit 51. The memory management circuit 51 may communicate with the host system 11 through the host interface 52. The host interface 52 may be used to receive and identify commands and data sent by the host system 11. For example, the commands and the data sent by the host system 11 may be sent to the memory management circuit 51 through the host interface 52. In addition, the memory management circuit 51 may send data to the host system 11 through the host interface 52. In the exemplary embodiment, the host interface 52 is compatible with the PCI express standard. However, it must be understood that the disclosure is not limited thereto. The host interface 52 may also be compatible with the SATA standard, the PATA standard, the IEEE 1394 standard, the USB standard, the SD standard, the UHS-I standard, the UHS-II standard, the MS standard, the MMC standard, the eMMC standard, the UFS standard, the CF standard, the IDE standard, or other suitable data transmission standards.

The memory interface 53 is coupled to the memory management circuit 51 and is used to access the rewritable non-volatile memory module 43. For example, the memory management circuit 51 may access the rewritable non-volatile memory module 43 through the memory interface 53. In other words, the data to be written into the rewritable non-volatile memory module 43 is converted into a format acceptable by the rewritable non-volatile memory module 43 via the memory interface 53. Specifically, if the memory management circuit 51 intends to access the rewritable non-volatile memory module 43, the memory interface 53 will send the corresponding command sequence. For example, the command sequences may include the write command sequence instructing to write data, the read command sequence instructing to read data, the erase command sequence instructing to erase data, and corresponding command sequences instructing various memory operations (for example, changing a read voltage level, executing a garbage collection operation, etc.). The command sequences are, for example, generated by the memory management circuit 51 and sent to the rewritable non-volatile memory module 43 through the memory interface 53. The command sequences may include one or more signals, or data on a bus. The signals or the data may include command codes or program codes. For example, the read command sequence includes information such as a read recognition code and a memory address.

In an exemplary embodiment, the memory control circuit unit 42 further includes an error detecting and correcting circuit 54, a buffer memory 55, and a power management circuit 56.

The error detecting and correcting circuit (also referred to as a decoding circuit) 54 is coupled to the memory management circuit 51 and is used to perform error detecting and correcting operations to ensure the correctness of data. Specifically, when the memory management circuit 51 receives a write command from the host system 11, the error detecting and correcting circuit 54 generates a corresponding error correcting code (ECC) and/or error detecting code (EDC) for the data corresponding to the write command, and the memory management circuit 51 writes the data corresponding to the write command and the corresponding error correcting code and/or error detecting code into the rewritable non-volatile in memory module 43. After that, when the memory management circuit 51 reads the data from the rewritable non-volatile memory module 43, the error correcting code and/or the error detecting code corresponding to the data is simultaneously read, and the error detecting and correcting circuit 54 performs the error detecting and correcting operations on the read data according to the error correcting code and/or the error detecting code.

The buffer memory 55 is coupled to the memory management circuit 51 and is used to temporarily store data. The power management circuit 56 is coupled to the memory management circuit 51 and is used to control the power of the memory storage device 10.

In an exemplary embodiment, the rewritable non-volatile memory module 43 of FIG. 4 may include a flash memory module. In an exemplary embodiment, the memory control circuit unit 42 of FIG. 4 may include a flash memory controller. In an exemplary embodiment, the memory management circuit 51 of FIG. 5 may include a flash memory management circuit.

Figure 6:
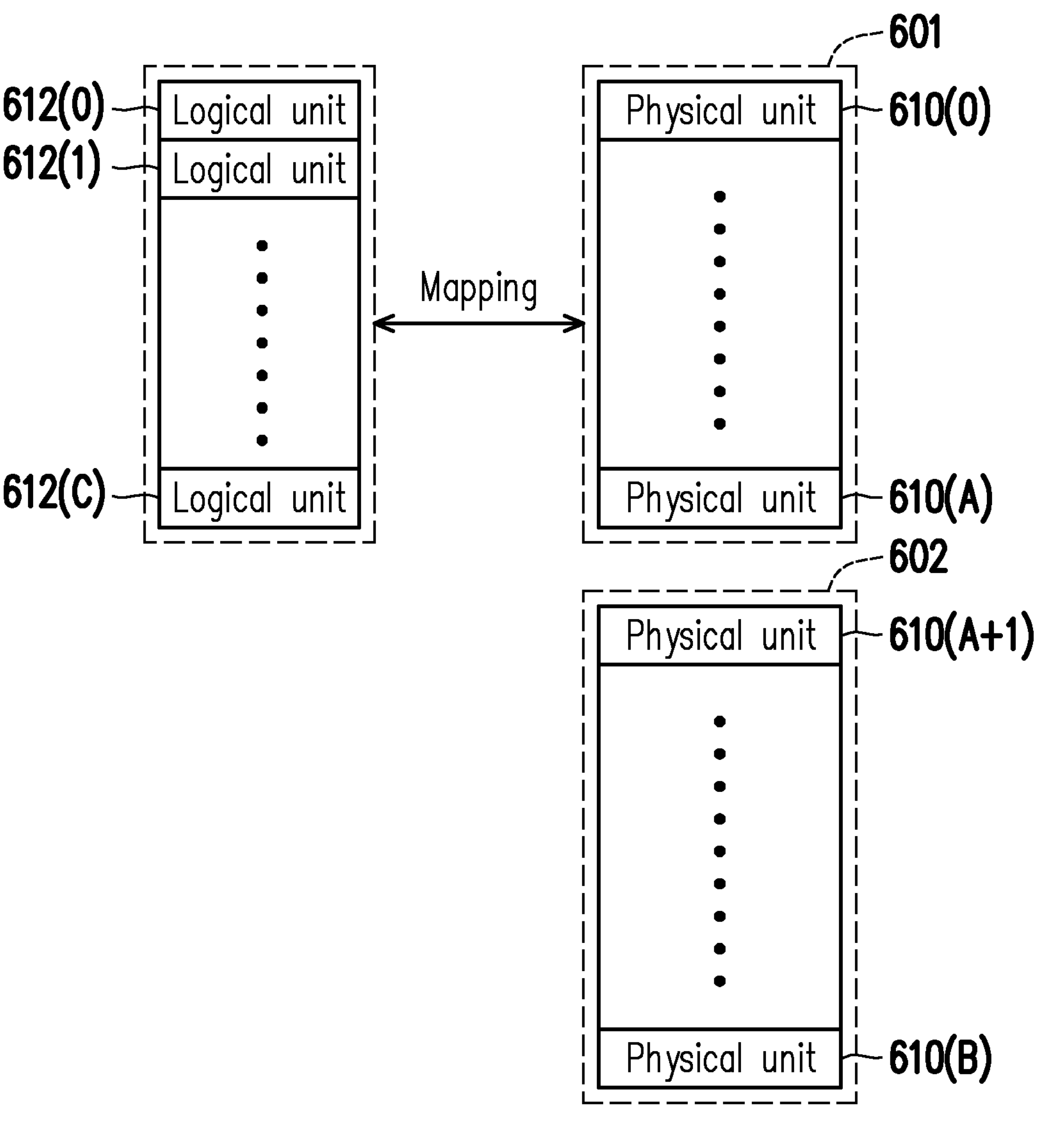
FIG. 6 is a schematic diagram of managing a rewritable non-volatile memory module according to an exemplary embodiment of the disclosure.

FIG. 6 is a schematic diagram of managing a rewritable non-volatile memory module according to an exemplary embodiment of the disclosure. Please refer to FIG. 6. The memory management circuit 51 may logically group physical units 610(0) to 610(B) in the rewritable non-volatile memory module 43 into a storage area 601 and a spare area 602.

In an exemplary embodiment, a physical unit refers to a physical address or a physical programming unit. In an exemplary embodiment, a physical unit may also be composed of multiple continuous or discontinuous physical addresses. In an exemplary embodiment, a physical unit may also refer to a virtual block (VB). A virtual block may include multiple physical addresses or multiple physical programming units.

The physical units 610(0) to 610(A) in the storage area 601 are used to store the user data (for example, the user data from the host system 11 of FIG. 1). For example, the physical units 610(0) to 610(A) in the storage area 601 may store valid data and invalid data. The physical units 610(A+1) to 610(B) in the spare area 602 do not store data (for example, valid data). For example, if a certain physical unit does not store valid data, the physical unit may be associated (or added) to the spare area 602. In addition, the physical units (or the physical units that do not store valid data) in the spare area 602 may be erased. When writing new data, one or more physical units may be extracted from the spare area 602 to store the new data. In an exemplary embodiment, the spare area 602 is also referred to as a free pool.

The memory management circuit 51 may be configured with logical units 612(0) to 612(C) to map the physical units 610(0) to 610(A) in the storage area 601. In an exemplary embodiment, each logical unit corresponds to one logical address. For example, a logical address may include one or more logical block addresses (LBA) or other logical management units. In an exemplary embodiment, a logical unit may also correspond to one logical programming unit or consist of multiple continuous or discontinuous logical addresses.

It should be noted that one logical unit may be mapped to one or more physical units. If a certain physical unit is currently mapped by a certain logical unit, it means that data currently stored in the physical unit includes valid data. Conversely, if a certain physical unit is not currently mapped by any logical unit, it means that data currently stored in the physical unit is invalid data.

The memory management circuit 51 may record management data (also referred to as logical-to-physical mapping information) describing a mapping relationship between the logical unit and the physical unit in at least one logical-to-physical mapping table. When the host system 11 intends to read data from the memory storage device 10 or write data into the memory storage device 10, the memory management circuit 51 may access the rewritable non-volatile memory module 43 according to the information in the logical-to-physical mapping table.

The rewritable non-volatile memory module 43 may program memory cells to store data based on multiple write modes (also referred to as programming modes). In the following exemplary embodiment, the write modes including a first write mode and a second write mode are used as examples, but the disclosure is not limited thereto. In other exemplary embodiments, the rewritable non-volatile memory module 43 may also store data based on more write modes (for example, a third write mode), which is not limited in the disclosure.

In an exemplary embodiment, a memory cell programmed based on the first write mode in the rewritable non-volatile memory module 43 may be used to store p bits. A memory cell programmed based on the second write mode in the rewritable non-volatile memory module 43 may be used to store q bits. Both p and q are positive integers, and p is different from q.

In an exemplary embodiment, the first write mode may include an SLC mode or a pseudo SLC mode, and the second write mode may include a TLC mode. Therefore, p may be 1 and q may be 3, but the disclosure is not limited thereto. In an exemplary embodiment, the first write mode and the second write mode may respectively include other programming modes, and p and/or q may be other positive integers, as long as p is less than q (or p is different from q).

The memory management circuit 51 may monitor a data write behavior (also referred to as a first data write behavior) of the host system 11 during a time range (also referred to as a first time range). For example, the first data write behavior may be used to write data (also referred to as first data) from the host system 11 to the rewritable non-volatile memory module 43 during the first time range.

According to the first data write behavior, the memory management circuit 51 may predict a data write behavior (also referred to as a second data write behavior) of the host system 11 during another time range (also referred to as a second time range). For example, the second data write behavior may be used to write data (also referred to as second data) from the host system 11 to the rewritable non-volatile memory module 43 during the second time range. The second time range may be different from the first time range. For example, the second time range may follow the first time range.

On the other hand, the memory management circuit 51 may obtain a measurement parameter (also referred to as a first measurement parameter) and a target parameter (also referred to as a first target parameter) corresponding to the first data write behavior. The first measurement parameter may be obtained through monitoring the first data write behavior in real time. For example, the first measurement parameter may reflect an actual write speed of the measured first data.

In an exemplary embodiment, the memory management circuit 51 may obtain the target parameter (that is, the first target parameter) corresponding to the first data write behavior according to a type (for example, sequential write and/or random write) of the first data write behavior and the adopted write mode (for example, the first write mode and/or the second write mode). For example, the first target parameter may reflect a preset write speed (also referred to as a target write speed) corresponding to the first data write behavior.

In an exemplary embodiment, a management table may be pre-stored in the rewritable non-volatile memory module 43 (for example, stored in the system area of the rewritable non-volatile memory module 43). The management table may record target parameters respectively corresponding to different data write behaviors. Therefore, according to the first data write behavior, the memory management circuit 51 may obtain the corresponding target parameter from the management table as the first target parameter. For example, if the type of the first data write behavior is sequential write and the write mode adopted by the first data write behavior is the first write mode (for example, the SLC mode), the memory management circuit 51 may query the management table according to the information to obtain the first target parameter. In an exemplary embodiment, the memory management circuit 51 may also update (for example, adjust) the information (for example, the first target parameter corresponding to the first data write behavior) in the management table according to the first measurement parameter to continuously optimize the management table.

The memory management circuit 51 may determine at least one write control parameter according to the first measurement parameter, the first target parameter, and the second data write behavior. Then, the memory management circuit 51 may send at least one write command sequence to the rewritable non-volatile memory module 43 according to the write control parameter to instruct the rewritable non-volatile memory module 43 to perform a data write based on the write modes during the second time range. In particular, a write data amount corresponding to each of the write modes may be controlled by the write control parameter.

Figure 7:
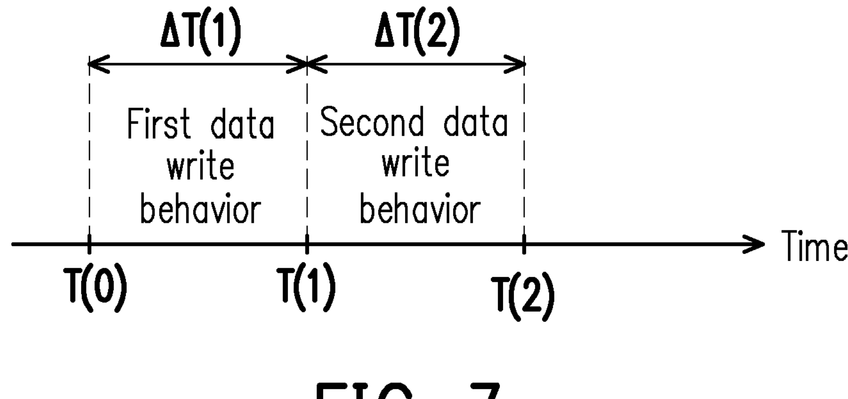
FIG. 7 is a schematic diagram of a first time range and a second time range and a corresponding first data write behavior and second data write behavior according to an exemplary embodiment of the disclosure.

FIG. 7 is a schematic diagram of a first time range and a second time range and a corresponding first data write behavior and second data write behavior according to an exemplary embodiment of the disclosure. Please refer to FIG. 7, it is assumed that the first time range is between time points T(0) to T(1), and the second time range is between time points T(1) to T(2). The second time range is sorted after the first time range on a time axis (that is, the horizontal axis of FIG. 7), and the first time range and the second time range do not overlap with each other. A time length $\Delta T(1)$ covered by the first time range may be the same or different from a time length $\Delta T(2)$ covered by the second time range.

In addition, in an exemplary embodiment, there may be some time interval between the first time range and the second time range, which is not limited in the disclosure.

In an exemplary embodiment, the memory management circuit 51 may predict a write data amount (that is, the data amount of the second data) of the host system 11 during the second time range according to the first data write behavior of the host system 11 during the first time range. For example, the memory management circuit 51 may obtain an actual write speed of the host system 11 during the first time range (that is, an actual write speed of the first data) according to the write data amount (that is, the data amount of the first data) corresponding to the first data write behavior and the time length ΔT(1) covered by the first time range. Then, the memory management circuit 51 may predict a write data amount of the host system 11 during the second time range according to the actual write speed and the time length ΔT(2) covered by the second time range. For example, the memory management circuit 51 may predict the write data amount of the host system 11 during the second time range according to the following Equations (1.1) and (1.2).

$$V(1)=S(1)/\Delta T(1) \tag{1.1}$$

$$S(2)=V(1)\times\Delta T(2) \tag{1.2}$$

In Equations (1.1) and (1.2), V(1) represents the actual write speed of the host system 11 during the first time range, S(1) represents the data amount of the first data, and S(2) represents the data amount of the second data.

After predicting the write data amount (that is, the data amount of the second data) of the host system 11 during the second time range, the memory management circuit 51 may control the rewritable non-volatile memory module 43 to store the second data during the second time range through the write control parameter to try to keep the data write speed of the host system 11 stable during the second time range and/or prevent the data write speed from changing too much during the second time range.

In an exemplary embodiment, the write control parameter may be used to control the write data amount (also referred to as a first write data amount) corresponding to the first write mode and the write data amount (also referred to as a second write data amount) corresponding to the second write mode during the second time range. In particular, the write control parameter may be used to control the sum of the first write data amount and the second write data amount to be not less than (that is, greater than or equal to) a (total) predicted write data amount of the host system 11 during the second time range. In this way, it can be ensured that the second data may be smoothly and completely stored to the rewritable non-volatile memory module 43 during the second time range.

In an exemplary embodiment, the memory management circuit 51 may determine the write control parameter according to the following Equation (2.1).

$$S(2)=V(M1)\times\Delta T(1)\times x\ \%\ V(M2)\times\Delta T(\mathbf{1})\times y\ \% \tag{2.1}$$

In Equation (2.1), V(M1) represents the preset write speed of the rewritable non-volatile memory module 43 storing data based on the first write mode, V(M2) represents the preset write speed of the rewritable non-volatile memory module 43 storing data based on the second write mode, and parameters x and y represent the write control parameters. According to Equation (2.1), the parameter x may be used to control a data amount of partial data stored in the second data based on the first write mode, and the parameter y may be used to control a data amount of partial data stored in the second data based on the second write mode.

In an exemplary embodiment, the memory management circuit 51 may dynamically set or adjust the write control parameters (for example, the parameters x and y in Equation (2.1)) to satisfy predicted data (that is, the second data) storage requirements of the host system 11 during the second time range and to keep the write speed of the second data stable.

In an exemplary embodiment, the first measurement parameter includes the actual write speed of the host system 11 during the first time range, and the first target parameter includes a target write speed of the host system 11 during the first time range. For example, the actual write speed of the host system 11 during the first time range may be obtained through monitoring the first data write behavior in real time. In addition, the target write speed of the host system 11 during the first time range may include the preset write speed (that is, the target write speed) corresponding to the first data write behavior.

In an exemplary embodiment, the memory management circuit 51 may determine the write control parameter according to the actual write speed and the target write speed. Through dynamically setting or adjusting the write control parameter, the memory management circuit 51 may try to control a predicted data write speed of the host system 11 during the second time range to be between the actual write speed and the target write speed.

In an exemplary embodiment, the memory management circuit 51 may determine the write control parameter according to the following Equation (3.1).

$$V(2)=V(M1)\times x\ \%\ V(M2)\times y\ \% \tag{3.1}$$

In Equation (3.1), V(2) represents the predicted write speed of the host system 11 during the second time range. Through dynamically setting or adjusting the parameters x and y in Equation (3.1), the memory management circuit 51 may try to control the predicted data write speed of the host system 11 during the second time range to be between the actual write speed and the target write speed.

In an exemplary embodiment, the memory management circuit 51 may also determine an allowable speed (also referred to as a fluctuation allowable speed) according to the actual write speed. An error between the fluctuation allowable speed and the actual write speed is less than a preset ratio. For example, the preset ratio may be expressed as z %, and the value of z may be adjusted according to practical requirements.

In an exemplary embodiment, the memory management circuit 51 may determine the write control parameter according to the actual write speed and the fluctuation allowable speed. Through dynamically setting or adjusting the write control parameter, the memory management circuit 51 may try to control the predicted data write speed of the host system 11 during the second time range to be between the actual write speed and the fluctuation allowable speed. In this way, the effect of keeping the data write speed of the host system 11 stable during the second time range can also be achieved.

In an exemplary embodiment, when the actual write speed is greater than the target write speed, the memory management circuit 51 may dynamically set or adjust the write control parameter, so that the predicted data write speed of the host system 11 during the second time range is controlled to be between the actual write speed and a reference threshold (also referred to as a first reference threshold). For example, the first reference threshold is the larger one of the target write speed and the fluctuation allowable speed. For example, the memory management circuit 51 may compare the target write speed with the fluctuation allowable speed. If the target write speed is greater than the fluctuation allowable speed, the memory management circuit 51 may set the target write speed as the first reference threshold. Alternatively, if the target write speed is less than the fluctuation allowable speed, the memory management circuit 51 may set the fluctuation allowable speed as the first reference threshold.

In an exemplary embodiment, when the actual write speed is less than the target write speed, the memory management circuit 51 may dynamically set or adjust the write control parameter, so that the predicted data write speed of the host system 11 during the second time range is controlled to be between the actual write speed and another reference threshold (also referred to as a second reference threshold). For example, the second reference threshold is the smaller one of the target write speed and the fluctuation allowable speed. For example, the memory management circuit 51 may compare the target write speed with the fluctuation allowable speed. If the target write speed is greater than the fluctuation allowable speed, the memory management circuit 51 may set the fluctuation allowable speed as the second reference threshold. Alternatively, if the target write speed is less than the fluctuation allowable speed, the memory management circuit 51 may set the target write speed as the second reference threshold.

In an exemplary embodiment, during the process of determining the write control parameters (for example, the parameters x and y) according to Equations (2.1) and/or (3.1), the memory management circuit 51 selects a solution set containing the largest parameter y from multiple solution sets of (x, y) as the best solution set. Thereby, in a second data write operation, the memory management circuit 51 can maximize the data amount of data stored based on the second write mode (for example, the TLC mode) and/or reduce the data amount of data stored based on the first write mode (for example, the SLC mode), thereby reducing a consumption speed of physical units programmed based on the first write mode (for example, the SLC mode) in the rewritable non-volatile memory module 43.

It should be noted that in the foregoing exemplary embodiments, the second data write behavior containing data storage based on multiple write modes is used as an example for description. However, in another exemplary embodiment, the second data write behavior during the second time range may also perform data storage based on only one of the first write mode and the second write mode, which is not limited in the disclosure. For example, in an exemplary embodiment, if the parameter y in Equations (2.1) and/or (3.1) is set to zero, it means that only the first write mode is used to store data (that is, the second write mode is not enabled) during the second time range. Alternatively, in an exemplary embodiment, if the parameter x in Equations (2.1) and/or (3.1) is set to zero, it means that only the second write mode is used to store data (that is, the first write mode is not enabled) during the second time range.

In an exemplary embodiment, the memory management circuit 51 may monitor an available capacity corresponding to the first write mode (for example, the SLC mode) in the rewritable non-volatile memory module 43 in real time. The memory management circuit 51 may determine whether to enable the second write mode during the second time range according to the available capacity. For example, the memory management circuit 51 may judge whether the available capacity corresponding to the first write mode (for example, the SLC mode) in the rewritable non-volatile memory module 43 is less than a preset value. If the available capacity is less than the preset value, the memory management circuit 51 may determine to enable the second write mode (that is, set the parameter y in Equations (2.1) and/or (3.1) to a value greater than zero) during the second time range. Alternatively, if the available capacity is not less than the preset value, the memory management circuit 51 may determine not to enable the second write mode (that is, set the parameter y in Equations (2.1) and/or (3.1) to be zero) during the second time range.

In an exemplary embodiment, in response to the available capacity being less than the preset value, the memory management circuit 51 may further perform a garbage collection (GC) process during the second time range. During the GC process, valid data may be copied from a source unit (that is, a physical unit storing the valid data) to a target unit to increase the available capacity corresponding to the first write mode.

In an exemplary embodiment, the memory management circuit 51 may determine whether to enable the second write mode during the second time range according to the predicted write data amount (that is, the data amount of the second data) of the host system 11 during the second time range and the available capacity corresponding to the first write mode (for example, the SLC mode) in the rewritable non-volatile memory module 43. For example, if the predicted write data amount of the host system 11 during the second time range is greater than the available capacity, the memory management circuit 51 may determine to enable the second write mode (that is, the parameter y in Equations (2.1) and/or (3.1) is set to a value greater than zero) during the second time range. Alternatively, if the predicted write data amount of the host system 11 during the second time range is not greater than the available capacity, the memory management circuit 51 may determine not to enable the second write mode (that is, the parameter y in Equations (2.1) and/or (3.1) is set to zero) during the second time range. In addition, the memory management circuit 51 may also determine whether to enable the second write mode during the second time range together with other management rules, which is not limited in the disclosure.

Figure 8:
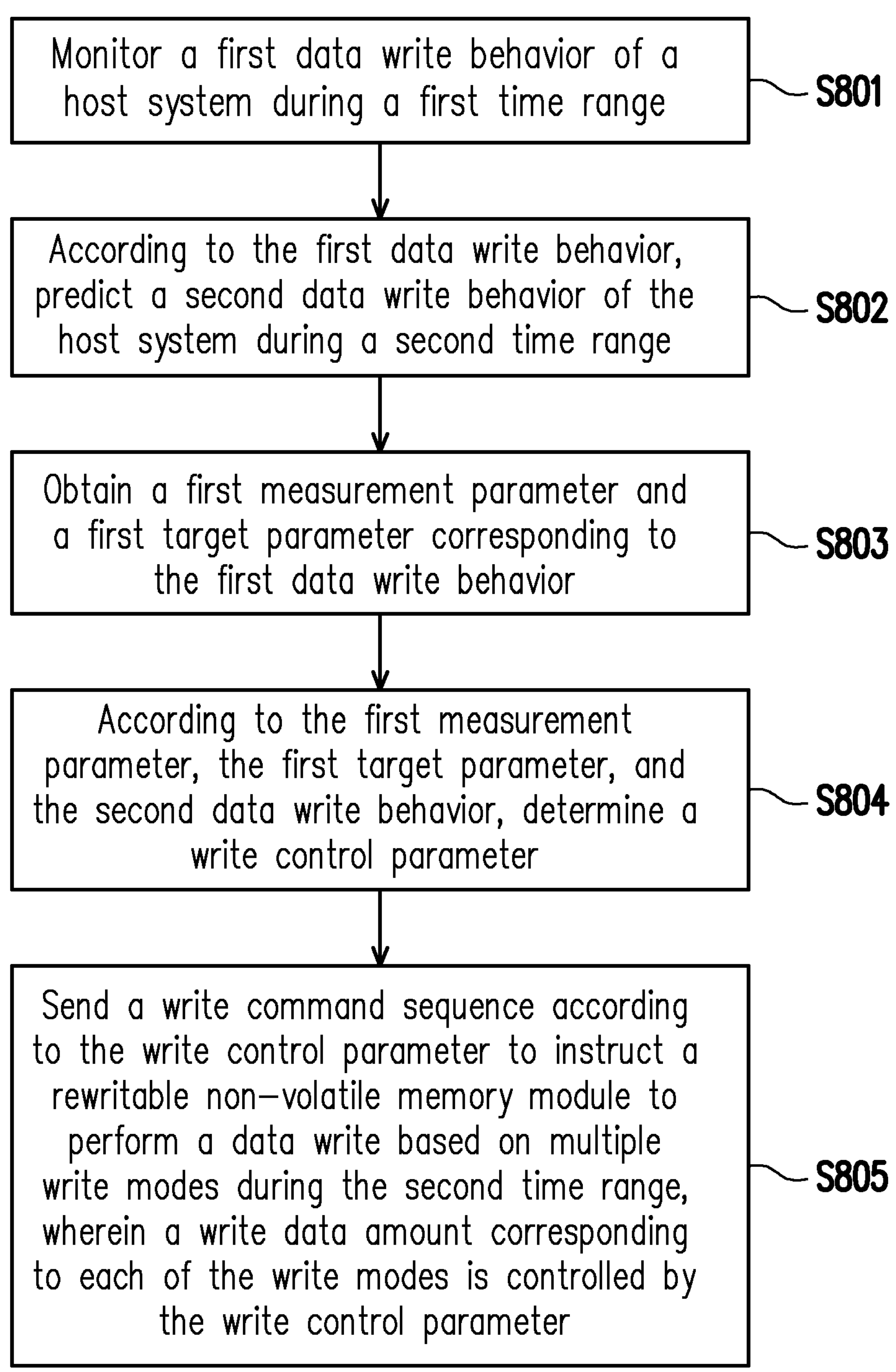
FIG. 8 is a flowchart of a write control method based on write behavior prediction according to an exemplary embodiment of the disclosure.

FIG. 8 is a flowchart of a write control method based on write behavior prediction according to an exemplary embodiment of the disclosure. Please refer to FIG. 8. In Step S801, a first data write behavior of a host system during a first time range is monitored. In Step S802, according to the first data write behavior, a second data write behavior of the host system during a second time range is predicted, wherein the second time range is different from the first time range. In Step S803, a first measurement parameter and a first target parameter corresponding to the first data write behavior are obtained. In Step S804, according to the first measurement parameter, the first target parameter, and the second data write behavior, a write control parameter is determined. In Step S805, a write command sequence is sent according to the write control parameter to instruct a rewritable non-volatile memory module to perform a data write based on multiple write modes during the second time range, wherein a write data amount corresponding to each of the write modes is controlled by the write control parameter.

However, each step in FIG. 8 has been described in detail as above and will not be repeated. It should be noted that each step in FIG. 8 may be implemented as multiple program codes or circuits, which is not limited in the disclosure. In addition, the method of FIG. 8 may be used together with the above exemplary embodiments or may be used alone, which is not limited in the disclosure.

In summary, in the exemplary embodiments of the disclosure, the second data write behavior of the host system during the second time range may be predicted according to the first data write behavior of the host system during the first time range, and the write control parameter may be determined according to the prediction result. In particular, the write control parameter may be used to control the write data amount corresponding to each of the write modes during the second time range. Thereby, the stability of the data write speed of the memory storage device can be effectively improved.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A write control method based on write behavior prediction, configured for a rewritable non-volatile memory module, the write control method comprising:

monitoring a first data write behavior comprising writing first data from a host system to the rewritable non-volatile memory module to obtain a first measurement parameter reflecting an actual write speed of the first data;

querying a management table to obtain a first target parameter reflecting a preset write speed corresponding to the first data write behavior;

predicting a second data write behavior comprising writing second data from the host system to the rewritable non-volatile memory module according to the first data write behavior;

dynamically adjusting write control parameters comprising adjusting a first write parameter and adjusting a second write parameter according to the first measurement parameter, the first target parameter, and the predicted second data write behavior; and sending a write command sequence to the rewritable non-volatile memory module according to the write control parameters, wherein the write command sequence is configured to instruct the rewritable non-volatile memory module to perform a data write comprising storing the second data using the write control parameters, wherein the second data comprises first partial data and second partial data, the first write parameter is configured to control only the first partial data being stored based on a first write mode to the rewritable non-volatile memory module, the second write parameter is configured to control only the second partial data being stored based on a second write mode to the rewritable non-volatile memory module, and a total number of bit stored in one memory cell within the rewritable non-volatile memory module, based on the first write mode is less than a total number of bit stored in an other memory cell within the rewritable non-volatile memory module, based on the second write mode, wherein a data write speed of the host system is controlled to be between the actual write speed and the preset write speed according to the write control parameters.

2. The write control method according to claim 1, wherein the step of predicting the second data write behavior comprising writing the second data from the host system to the rewritable non-volatile memory module according to the first data write behavior comprises:

predicting a data amount of the second data according to the first data write behavior.

3. The write control method according to claim 1, wherein the step of determining, according to the actual write speed and the preset write speed, the write control parameters further comprises:

determining a fluctuation allowable speed according to the actual write speed, wherein an error between the fluctuation allowable speed and the actual write speed is less than a preset ratio; and according to the actual write speed and the fluctuation allowable speed, determining the write control parameter to control the data write speed of the host system to be between the actual write speed and the fluctuation allowable speed.

4. The write control method according to claim 1, wherein the step of predicting the second data write behavior comprising writing the second data from the host system to the rewritable non-volatile memory module according to the first data write behavior comprises:

determining, according to an available capacity corresponding to the first write mode, whether to enable the second write mode.

5. A memory storage device, comprising:

a connection interface unit, configured to couple to a host system;

a rewritable non-volatile memory module; and a memory control circuit unit, coupled to the connection interface unit and the rewritable non-volatile memory module, wherein the memory control circuit unit is configured to:

monitor a first data write behavior comprising writing first data from a host system to the rewritable non-volatile memory module to obtain a first measurement parameter reflecting an actual write speed of the first data;

query a management table to obtain a first target parameter reflecting a preset write speed corresponding to the first data write behavior;

predict a second data write behavior comprising writing second data from the host system to the rewritable non-volatile memory module according to the first data write behavior;

dynamically adjust write control parameters comprising adjusting a first write parameter and adjusting a second write parameter according to the first measurement parameter, the first target parameter, and the predicted second data write behavior; and send a write command sequence to the rewritable non-volatile memory module according to the write control parameters, wherein the write command sequence is configured to instruct the rewritable non-volatile memory module to perform a data write comprising storing the second data using the write control parameters, wherein the second data comprises first partial data and second partial data, the first write parameter is configured to control only the first partial data being stored based on a first write mode to the rewritable non-volatile memory module, the second write parameter is configured to control only the second partial data being stored based on a second write mode to the rewritable non-volatile memory module, and a total number of bit stored in one memory cell within the rewritable non-volatile memory module, based on the first write mode is less than a total number of bit stored in an other memory cell within the rewritable non-volatile memory module, based on the second write mode, wherein a data write speed of the host system is controlled to be between the actual write speed and the preset write speed according to the write control parameters.

6. The memory storage device according to claim 5, wherein the operation of the memory control circuit unit predicting the second data write behavior comprising writing the second data from the host system to the rewritable non-volatile memory module according to the first data write behavior comprises:

predicting a data amount of the second data according to the first data write behavior.

7. The memory storage device according to claim 5, wherein the operation of the memory control circuit unit determining, according to the actual write speed and the preset write speed, the write control parameters further comprises:

determining a fluctuation allowable speed according to the actual write speed, wherein an error between the fluctuation allowable speed and the actual write speed is less than a preset ratio; and according to the actual write speed and the fluctuation allowable speed, determining the write control parameter to control the data write speed of the host system to be between the actual write speed and the fluctuation allowable speed.

8. The memory storage device according to claim 5, wherein the operation of the memory control circuit unit predicting the second data write behavior comprising writing the second data from the host system to the rewritable non-volatile memory module according to the first data write behavior comprises:

determining, according to an available capacity corresponding to the first write mode, whether to enable the second write mode.

9. A memory control circuit unit, configured to control a rewritable non-volatile memory module, the memory control circuit unit comprising:

a host interface, configured to couple to a host system;

a memory interface, configured to couple to the rewritable non-volatile memory module; and a memory management circuit, coupled to the host interface and the memory interface, wherein the memory management circuit is configured to:

monitor a first data write behavior comprising writing first data from a host system to the rewritable non-volatile memory module to obtain a first measurement parameter reflecting an actual write speed of the first data;

query a management table to obtain a first target parameter reflecting a preset write speed corresponding to the first data write behavior;

predict a second data write behavior comprising writing second data from the host system to the rewritable non-volatile memory module according to the first data write behavior;

dynamically adjust write control parameters comprising adjusting a first write parameter and adjusting a second write parameter according to the first measurement parameter, the first target parameter, and the predicted second data write behavior; and send a write command sequence to the rewritable non-volatile memory module according to the write control parameters, wherein the write command sequence is configured to instruct the rewritable non-volatile memory module to perform a data write comprising storing the second data using the write control parameters, wherein the second data comprises first partial data and second partial data, the first write parameter is configured to control only the first partial data being stored based on a first write mode to the rewritable non-volatile memory module, the second write parameter is configured to control only the second partial data being stored based on a second write mode to the rewritable non-volatile memory module, and a total number of bit stored in one memory cell within the rewritable non-volatile memory module, based on the first write mode is less than a total number of bit stored in an other memory cell within the rewritable non-volatile memory module, based on the second write mode, wherein a data write speed of the host system is controlled to be between the actual write speed and the preset write speed according to the write control parameters.

10. The memory control circuit unit according to claim 9, wherein the operation of the memory management circuit predicting the second data write behavior comprising writing the second data from the host system to the rewritable non-volatile memory module according to the first data write behavior comprises:

predicting a data amount of the second data according to the first data write behavior.

11. The memory control circuit unit according to claim 9, wherein the operation of the memory management circuit determining, according to the actual write speed and the preset write speed, the write control parameters further comprises:

determining a fluctuation allowable speed according to the actual write speed, wherein an error between the fluctuation allowable speed and the actual write speed is less than a preset ratio; and according to the actual write speed and the fluctuation allowable speed, determining the write control parameter to control the data write speed of the host system to be between the actual write speed and the fluctuation allowable speed.

12. The memory control circuit unit according to claim 9, wherein the operation of the memory management circuit predicting the second data write behavior comprising writing the second data from the host system to the rewritable non-volatile memory module according to the first data write behavior comprises:

determining, according to an available capacity corresponding to the first write mode, whether to enable the second write mode.

* * * * *